(12) United States Patent
Park

(10) Patent No.: US 8,197,765 B2
(45) Date of Patent: Jun. 12, 2012

(54) WASTE GAS PURIFICATION APPARATUS

(76) Inventor: Young Bae Park, Suwon-si (KR)

(*) Notice: Subject to any disclaimer, the term of this patent is extended or adjusted under 35 U.S.C. 154(b) by 631 days.

(21) Appl. No.: 12/306,363

(22) PCT Filed: Dec. 1, 2006

(86) PCT No.: PCT/KR2006/005147
§ 371 (c)(1),
(2), (4) Date: Dec. 23, 2008

(87) PCT Pub. No.: WO2007/148858
PCT Pub. Date: Dec. 27, 2007

(65) Prior Publication Data
US 2009/0246094 A1 Oct. 1, 2009

(30) Foreign Application Priority Data
Jun. 23, 2006 (KR) .................. 10-2006-0057055

(51) Int. Cl.
B01D 50/00 (2006.01)
F01N 3/10 (2006.01)
B23K 26/00 (2006.01)
(52) U.S. Cl. ............... 422/171; 422/172; 422/186.03; 219/121.36
(58) Field of Classification Search ............. 422/171, 422/186.03, 172, 168; 219/121.36
See application file for complete search history.

(56) References Cited

U.S. PATENT DOCUMENTS

| 5,800,792 | A * | 9/1998 | Ibaraki et al. .............. 423/210 |
| 5,900,217 | A * | 5/1999 | Hartung et al. ............. 422/171 |
| 7,394,041 | B2 * | 7/2008 | Choi ..................... 219/121.36 |
| 7,438,869 | B1 * | 10/2008 | Fabian et al. ........... 422/186.03 |
| 7,465,843 | B2 * | 12/2008 | Gnedenko et al. ........... 585/242 |
| 2003/0000823 | A1 * | 1/2003 | Uhm et al. .............. 204/157.43 |
| 2004/0195088 | A1 * | 10/2004 | Rostaing et al. ............ 204/164 |

FOREIGN PATENT DOCUMENTS
| JP | 10-17647 | 6/1998 |
| KR | 20-0419359 | 6/2006 |
| WO | WO 2004051047 | 6/2004 |

* cited by examiner

Primary Examiner — Nina Bhat
(74) Attorney, Agent, or Firm — IPLA P.A.; James E. Bame

(57) ABSTRACT

A waste gas purification apparatus comprises: a heater, which heats waste gas mixed with reaction air to separate it into a solid reactant and a vapor purification gas; a water reserve tank unit, which has a water reserve tank communicated with the heater; a dust collector unit, which comprises a dust collector collecting the purification gas inflowed from the first process unit, and a water reserve tank communicated with lower portion of the dust collector; a scrubber unit, which comprises a scrubber inhaling the purification gas inflowed from the dust collector unit, and a reserve tank communicated with lower portion of the scrubber; and a collector, which has an adsorber and a remover filtering the purification gas inflowed from the scrubber unit, a water distributor being installed in upper portion of the remover and lower portion of the adsorber.

14 Claims, 5 Drawing Sheets

[Fig. 2]
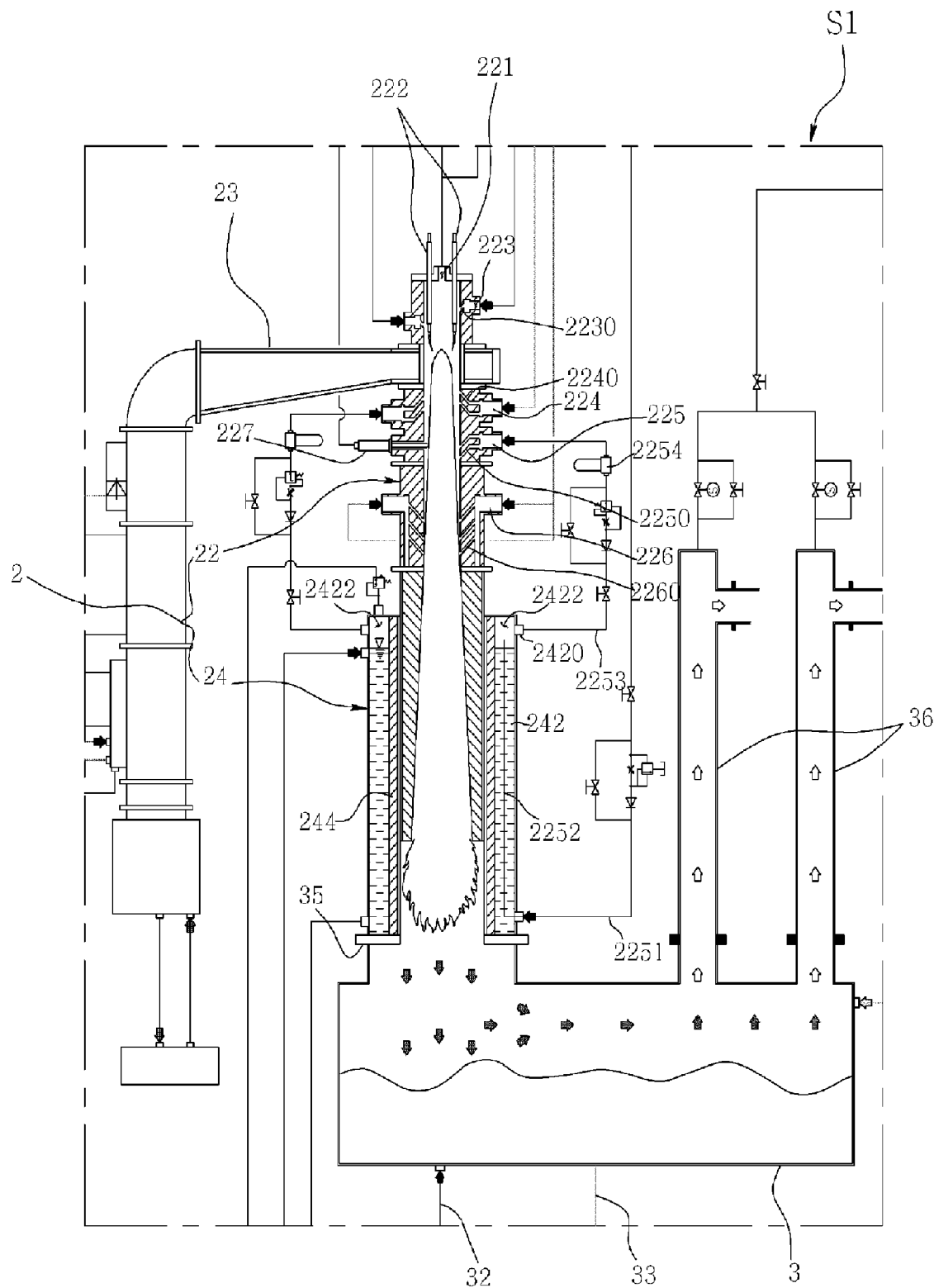

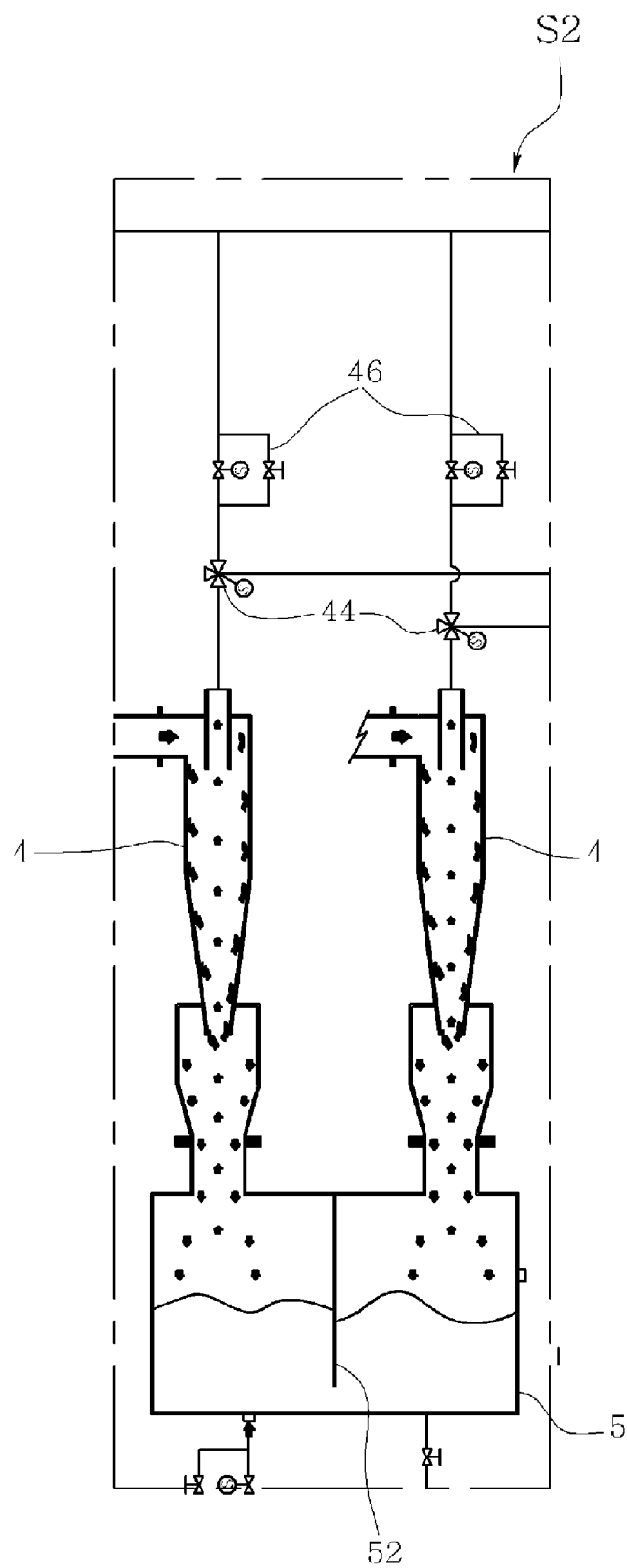
[Fig. 3]

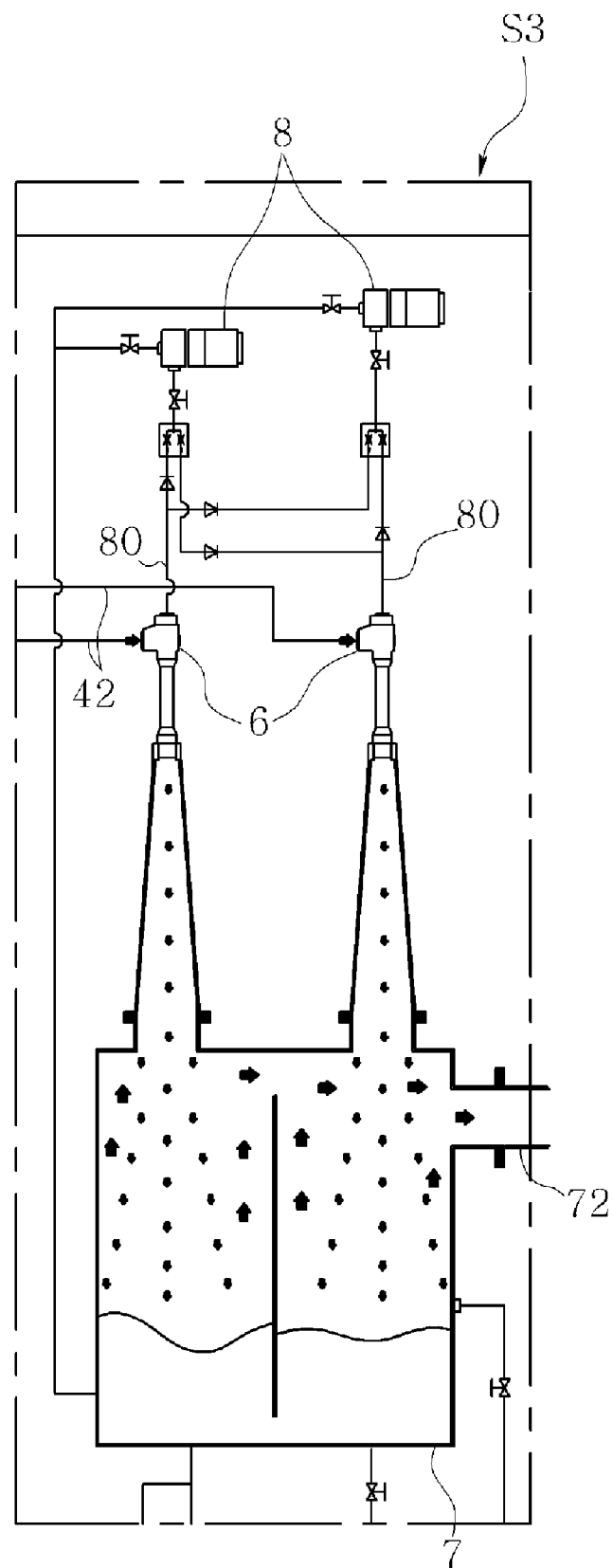
[Fig. 4]

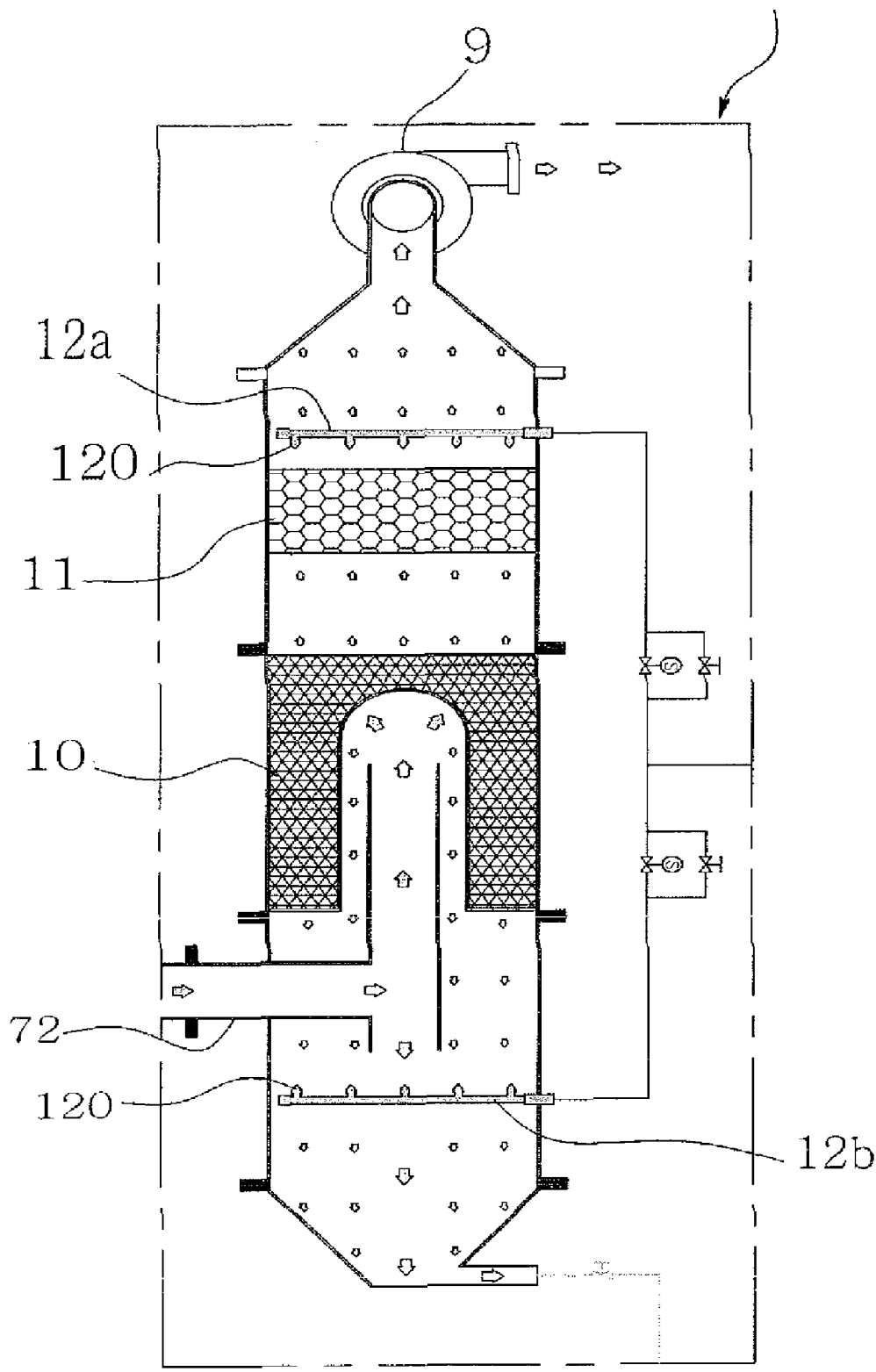
[Fig. 5]

WASTE GAS PURIFICATION APPARATUS

This application is a 371 of PCT/KR2006/005147 filed Dec. 1, 2006.

TECHNICAL FIELD

The present invention relates to a waste gas purification apparatus, and in particular to a waste gas purification apparatus which effectively treats toxic gases discharged from a semiconductor manufacturing process, etc.

BACKGROUND ART

Large amount of various toxic, corrosive, and combustible gases are generally used in the semiconductor manufacturing processes.

For instance, large amount of silane, dichlorosilane, ammonia, nitrogen oxide, arsine, phosphine, divorine, borone, trichloride, etc. are used in a chemical vapor deposition (CVD) process. Only small amount of these are consumed during the manufacturing process, waste gases (perfluorocompounds; PFCs) discharged therefrom contain highly concentrated harmful substances such as $CF_4$, $SF_6$, $NF_3$, etc.

In addition, various kinds of harmful waste gases are produced even in different semiconductor manufacturing processes such as low pressure CVD, plasma enhanced CVD, plasma etching, epitaxial deposition, etc.

The Environmental Law currently requires that the harmful substances in the waste gas should be removed prior to discharging the waste gas into the air.

Therefore, various techniques have heretofore been studied and practiced for the treatment of waste gases discharged from the semiconductor manufacturing processes. However, none of these waste gas treatment apparatuses developed heretofore have proved satisfactory in their capacity and their effectiveness, and many defects have been found therein.

Waste gas treatment methods that have been used conventionally may be largely classified into those of a wet-type, and a dry-type, but potential problems including manufacturing cost or effectiveness in each apparatus have been existed.

In a wet-type waste gas treatment apparatus, water is scattered in the waste gas, and reaction particles of harmful components, which react with water, are collected. The apparatus has excellent capabilities for treating harmful components, but there are disadvantages that a drain can be damaged by scattering materials during treatment process, particles of water droplets containing harmful components are scattered toward a ventilating passage, thereby eroding a ventilating duct, and therefore various kinds of water soluble pollutants should be inevitably removed prior to discarding the used water.

DISCLOSURE OF INVENTION

Technical Problem

To solve the above conventional problems, the present invention aims to provide a waste gas purification apparatus in which dust particles are captured into water after combusting the waste gases, that is produced in the semiconductor manufacturing process, under high heat, and final discharge gases are filtered by means of adsorption, thereby reducing the jeopardy of an explosion, and increasing waste gas treatment capacity.

Technical Solution

To accomplish the above object of the present invention, provided is a waste gas purification apparatus, which comprises: a heater, which heats waste gas mixed with reaction air to separate it into a solid reactant and a vapor purification gas; a first process unit, which has a water reserve tank communicated with the heater; a second process unit, which comprises a dust collector collecting the purification gas inflowed from the first process unit, and a water reserve tank communicated with lower portion of the dust collector; a third process unit, which comprises a scrubber inhaling the purification gas inflowed from the second process unit, and a reserve tank communicated with lower portion of the scrubber; and a collector, which has an adsorber and a remover filtering the purification gas inflowed from the third process unit, a water distributor being installed in upper portion of the remover and lower portion of the adsorber, and which has an outside discharger installed in upper portion thereof.

In the waste gas purification apparatus according to the present invention, the heater comprises: a burner, a plasma generator installed in one side of the burner, and a combustion chamber communicated with lower portion of the burner.

In the waste gas purification apparatus according to the present invention, the burner comprises: a nitrogen injection hole formed on top end thereof, into which a nitrogen gas is injected; electrodes installed in one side of the nitrogen injection hole; and air injection holes formed on upper portion situated higher than the plasma generator connected to one side of outer periphery thereof, wherein the air injection holes of plurality are formed on the outer periphery of the burner with different heights in a clockwise or counter-clockwise direction.

In the waste gas purification apparatus according to the present invention, each inlet passage of the air injection holes is inclined obliquely downward toward the center of the burner, such that the injected air may be aswirled inside the burner.

In the waste gas purification apparatus according to the present invention, waste gas injection holes of plurality are formed on the outer periphery of the burner, situated lower than the portion connected with the plasma generator, wherein each inlet passage of the waste gas injection holes is inclined obliquely upward toward the center of the burner.

In the waste gas purification apparatus according to the present invention, an fuel injection hole and an combustion gas injection hole are formed at the outer periphery of the burner, situated lower than the waste gas injection hole, and each inlet passage of the fuel injection hole and the combustion gas injection hole is inclined obliquely downward toward the center of the burner.

In the waste gas purification apparatus according to the present invention, the combustion chamber includes a cooling water tank, in which cooling water is stored at outermost layer thereof, multiple layer of heat insulation material being formed toward the center thereof, a fuel supply tube being connected at the outer periphery to communicate with the cooling water tank, the fuel supply tube being connected with a guide tube embedded inside the cooling water tank, and the combustion chamber being connected to the fuel injection hole of the burner through the fuel supply tube connected to an outlet formed on top end of the cooling water tank.

In the waste gas purification apparatus according to the present invention, inner side of the cooling water tank has 70–80% filled cooling water, water-tight space being formed at upper portion of the inner side thereof, and the fuel supply tube being connected with the water-tight space.

In the waste gas purification apparatus according to the present invention, the water reserve tank of the first process unit has a water supply pipe and a water drain pipe formed at lower portion thereof, and a conveying shoot, in which the purification gas is transported, formed at upper portion thereof.

In the waste gas purification apparatus according to the present invention, the dust collector of the second process unit is a cyclon type dust collector.

In the waste gas purification apparatus according to the present invention, the scrubber of the third process unit has a ventury tube in order to inhale the purification gas through ventury effect.

In the waste gas purification apparatus according to the present invention, the adsorber of the collector is a filter membrane coated with physical adsorbing agent.

In the waste gas purification apparatus according to the present invention, the remover of the collector is a diaphragm of a honeycomb shape.

In the waste gas purification apparatus according to the present invention, the water distributor of the collector is formed with a plurality of nozzles.

BRIEF DESCRIPTION OF THE DRAWINGS

FIG. 2 is a magnified view illustrating the first process unit of FIG. 1;

FIG. 3 is a magnified view illustrating the second process unit of FIG. 1;

FIG. 4 is a magnified view illustrating the third process unit of FIG. 1; and

FIG. 5 is a magnified view illustrating the collector of FIG. 1.

BEST MODE FOR CARRYING OUT THE INVENTION

Figure 1:
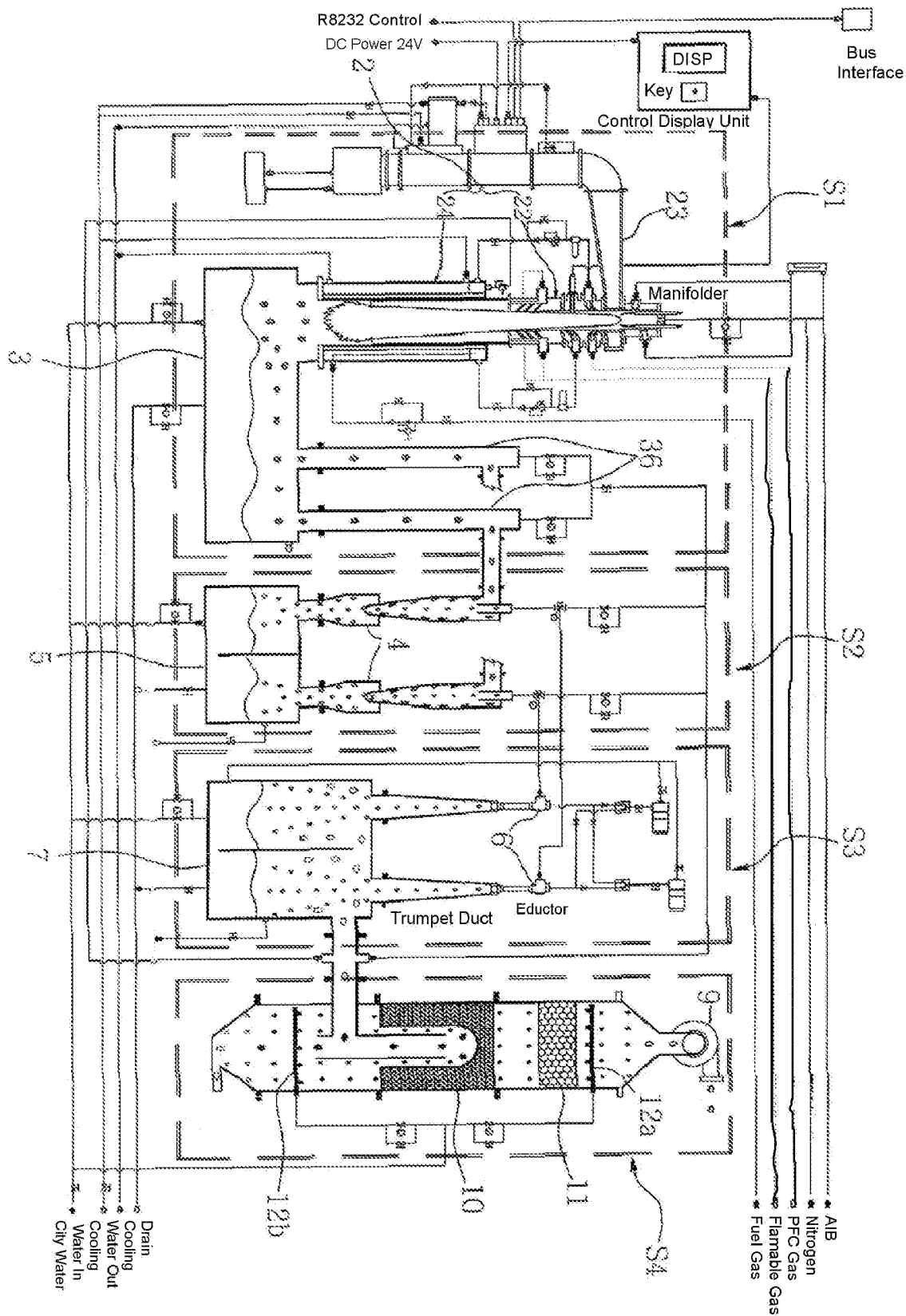
FIG. 1 is an overall schematic view illustrating the arrangement of the waste gas purification apparatus in accordance with the present invention.

Hereinafter, preferred exemplary embodiments in accordance with the present invention will be described in more detail with reference to the accompanying drawings.

Appended FIG. 1 is an overall schematic view illustrating the arrangement of the waste gas purification apparatus in accordance with the present invention, and FIG. 2 is a magnified view illustrating the first process unit of FIG. 1.

As depicted in FIG. 1 and FIG. 2, the first process unit (S1) comprises a heater (2), which heats waste gas mixed with reaction air to separate it into a solid reactant and a vapor purification gas, and a water reserve tank (3) communicated with the heater (2).

The heater (2) comprises a burner (22), a plasma generator (23) installed in one side of the burner (22), and a combustible chamber (24) communicated with lower portion of the burner (22).

The burner (22) is cylindrical shape having a hollow portion, and which comprises a nitrogen injection hole (221) formed on top end thereof, into which a nitrogen gas is injected; positive and negative electrode pair (222) installed in one side of the nitrogen injection hole (221); a plasma generator (23) connected to one side of the outer periphery thereof; and an air injection hole (223), into which the air is inflowed, formed on upper portion situated higher than the plasma generator (23), wherein the air injection holes of plurality are formed on the outer periphery of the burner (22) with different heights in a clockwise or counter-clockwise direction.

In this case, each inlet passage (2230) of the air injection holes is inclined obliquely downward toward the center of the burner (22), thereby the injected air may be aswirled inside the burner (22), and therefore enabling it to supply the air thereinto smoothly and to increase its firepower.

Waste gas injection holes (224) of plurality are formed symmetrically at lower side than the portion connected with the plasma generator (23), wherein each inlet passage (2240) of the waste gas injection holes (224) is inclined obliquely upward toward the center of the burner (22).

A fuel injection hole (225) is formed on the outer periphery of the burner (22), situated lower than the waste gas injection hole (224), wherein an inlet passage (2250) is inclined obliquely downward toward the center of the burner (22).

A combustion gas injection hole (226), into which the combustion gas is injected, is formed at lower portion of the fuel injection hole (225), and each combustion gas injection hole (226) has a branched inlet passage (2260) in order to improve the firepower, thereby enabling the burner (22) to inject the combustion gas within certain range, and therefore still improving the firepower.

In addition, a flame sensor (227) is arranged near the fuel injection hole (225) at the outer periphery of the burner (22), thereby detecting whether the flame is normally formed.

The combustion chamber (24) is arranged to communicate with the lower portion of the burner (22), where the flame is combusted most vigorously, such that it has insulation structure insulated against outside area.

That is, a cooling water tank (242) in which the cooling water is stored is formed at outermost layer of the combustion chamber (24), and heat insulation material (244) of plurality with ceramic material are interposed therein.

A fuel supply tube (2251) is connected at the outer periphery of the combustion chamber (24) to communicate with the cooling water tank (242), the fuel supply tube (2251) is connected with a guide tube (2252) embedded inside the cooling water tank (242), and the combustion chamber (24) is connected to the fuel injection hole (225) of the burner (22) through the fuel supply tube (2253) connected to an outlet formed on top end of the cooling water tank (242).

In this case, the fuel supply tube (2253) further comprises a backfire protector (2254) to prevent backfire accident.

The inner area of the cooling water tank (242) has 70~80% filled cooling water, water-tight space (2422) is formed at upper portion of the inner side thereof, and the fuel supply tube (2253) is connected with the water-tight space (2422).

Therefore, even though the backfire may be incurred through the fuel supply tube (2253) connected to the fuel injection hole (225), it is to be extinguished in the water-tight space (2422) of the cooling water tank (242), and thereby performing the function of safety device enabling to prevent the backfire accident.

A water reserve tank (3), which communicates with the lower portion of the combustion chamber (24) of the heater (2), is installed The water reserve tank (3) has a water supply pipe (32) and a water drain pipe (33) formed at lower portion thereof, a connector (35) connecting the combustion chamber (24) via flange connection at one side of the upper portion thereof, and a conveying shoot (36), in which the purification gas is transported, is arranged at the other side of the upper portion thereof.

Therefore, some of the residual scattering material after its combustion in the combustion chamber (24) is adsorbed in the water of the water reserve tank (3), and then precipitated, and other is transported to the second process unit (S2) through a plurality of the conveying shoot (36) arranged at the upper portion of the water reserve tank (3) with the stream of the purification gas.

Appended FIG. 3 is a magnified view illustrating the second process unit of FIG. 1.

As depicted in FIG. 3, the second process unit (S2) comprises a dust collector (4) for collecting the purification gas passing the first process unit (S1), and a water reserve tank (5) is arranged at the lower portion of the dust collector (4).

That is, the water reserve tank (5) is divided by a partition wall (52) installed inside thereof, the dust collector (4) is arranged at each divided water reserve tank, and each dust collector (4) is connected with the above-mentioned conveying shoot (36).

A cyclon dust collector can be utilized as the afore-mentioned dust collector, which is well known art, so detailed descriptions will be omitted, and other kinds of dust collector may be installed except the cyclon duct collector.

Therefore, the purification gas inflowed from the first process unit (S1) is collected through each dust collector (4), the collected scattering materials are adsorbed in the water of the water reserve tank (5), and the purification gas ascends again and is transported to the third process unit (S3).

In this case, conveying pipe (42) connected at the upper portion of the dust collector (4) is further connected with branching device (44) and bypass pipe (46), and, if necessary, which converts the moving direction of the purification gas.

That is, the purification gas discharged from the dust collector (4) is supplied to the third process unit (S3) through the conveying pipe (42) in normal condition, but the purification gas is allowed to be transported directly to the collector (S4) through the bypass pipe (44) in emergency condition such as failure of the third process unit (S3).

Appended FIG. 4 is a magnified view illustrating the third process unit of FIG. 1.

As depicted in FIG. 4, the third process unit (S3) comprises a scrubber (6) having a ventury tube (not shown) adapted to inhale the purification gas inflowed from the second process unit (S2) by ventury effect, and a reserve tank (7) communicated with the lower portion of the scrubber (6).

That is, highly pressurized water supplied from a cycle pump (8) prepared at upper portion of the scrubber (6), and a water supply pipe (80) connected thereto is flowed through the ventury tube (not shown) to the water reserve tank (7), such that the purification gas filled in the conveying pipe (42) connected at side of the scrubber (6) is inhaled by the pressure difference, thereby the purification gas mixed with the scattering water falls to the water reserve tank (7).

The structure of the ventury tube is well known, so detailed description will be omitted.

Therefore, relatively large particles of water droplets is collected in the water reserve tank (7), while relatively small particles of water droplets is scattered together with the purification gas, and then is transported through the conveying pipe (72) installed at side of the water reserve tank (7) to the collector (S4).

Appended FIG. 5 is a magnified view illustrating the collector of FIG. 1.

As depicted in FIG. 5, the collector (S4) comprises an outside discharger (9), such as a blower, at upper portion thereof, and an adsorber (10) and a remover (11) filtering the purification gas inflowed from the third process unit (S3) at inner side thereof, wherein above the upper portion of the remover (11) and under the lower portion of the adsorber (10), water distributors (12*a*, 12*b*) are installed.

The adsorber (10) can use a filter membrane coated with physical adsorbing agent.

The remover (11) is formed in a certain diaphragm of a honeycomb shape to remove dust, or water droplets, etc. contained in the purification gas.

The water distributor (12*a*, 12*b*) is formed with a plurality of nozzles to inject water toward the adsorber (10) and the remover (11) with high pressure at the upper and lower portion of the collector (S4), thereby enabling to collect and precipitate the particles contained in the purification gas.

A drain pipe for discharging the reserved water is arranged at the lower portion of the afore-mentioned first to third process unit (S1, S2, S3), and the collector (S4), a water supply pipe and a level controller are further arranged to regulate the amount of supplying water in order to maintain adequate pH concentration. Detail descriptions of such configurations will be omitted, since these can be readily employed for the ordinary person skilled in the art.

Hereinafter, the effect of the present invention as configured above will be described.

Nitrogen gas with high pressure is injected to the burner (22) through the nitrogen injection hole (221) of the burner (22) to perform the cleaning work of inside the apparatus.

Then, the air of the heater (2), the combustion gas, and the fuel are injected, the flame is generated by the ignition of the plasma generator (23) and the electrodes (222), and subsequently the waste gas is injected toward the generated flame to perform the combustion.

The fuel is supplied to the fuel injection hole (225) of the burner (22) through the fuel supply tube (2251), the guide tube, and the fuel supply tube (2253) of the combustion chamber (24), thereby, as previously mentioned, preventing the backfire by the water-tight space (2422) of the combustion chamber (24).

The air is injected to inside of the burner (22) through the air injection hole (223), and in the structure of the inlet passage (2240), the air is aswirled inside of the burner (22) and supplied, thereby supplying the air smoothly, and therefore increasing the firepower.

Large particle of dust generated after being combusted is adsorbed by the water of the water reserve tank (3), and the purification gas is inflowed into the dust collector (4) of the second process unit (S2) through the conveying shoot (36).

Large particle of dust collected in the dust collector (4) of the second process unit (S2) is precipitated in the water reserve tank (5), and the purification gas is transported to the third process unit (S3) through the conveying pipe (42).

The scattering material adsorbed with the particle of water while scattering toward the water reserve tank (5) through the scrubber (6) of the third process unit (S3) is precipitated in the water reserve tank (5), and the purification gas is transported to the collector (S4) again.

As the purification gas inflowed into the collector (S4) ascends by virtue of the adsorbing force of the outside discharger (9), it is captured in the particle of water, the captured particles are precipitated in the bottom, and the purified air is discharged into the air through the outside discharger (9).

Thus, when one cycle of the purification process has finished, nitrogen gas is injected to the burner (22) of the heater (2) to perform the cleaning operation inside the apparatus, and stand-by next purification process.

In the foregoing specification, the present invention has been described with reference to specific exemplary embodiments thereof. However, it will be evident that various modifications may be made thereto without departing from the broader spirit and scope of the invention as set forth in the following claims. The specification and drawings are, accordingly, to be regarded as an illustrative sense rather than a restrictive sense.

Industrial Applicability

As described hereinabove, according to the present invention, the waste gas generated from the semiconductor manufacturing process is combusted under high heat, the combusted dust is captured in water, and final discharge gas is filtered by adsorption, thereby decreasing the jeopardy of an explosion, and effectively increasing the gas treatment capacity.

The invention claimed is:

1. A waste gas purification apparatus, which comprises:
   a heater, which heats waste gas mixed with reaction air to separate it into a solid reactant and a vapor purification gas;
   a water reserve tank unit, which has a water reserve tank communicated with the heater;
   a dust collector unit, which comprises a dust collector collecting the purification gas inflowed from the first process unit, and a water reserve tank communicated with lower portion of the dust collector; and
   a scrubber unit, which comprises a scrubber inhaling the purification gas inflowed from the dust collector unit, and a reserve tank communicated with lower portion of the scrubber; and a collector, which has an adsorber and a remover filtering the purification gas inflowed from the scrubber unit, a water distributor being installed in upper portion of the remover and lower portion of the adsorber, and which has an outside discharger installed in upper portion thereof.

2. The waste gas purification apparatus as set forth in claim 1, wherein the heater comprises: a burner, a plasma generator installed in one side of the burner, and a combustion chamber communicated with lower portion of the burner.

3. The waste gas purification apparatus as set forth in claim 2, wherein the burner comprises:
   a nitrogen injection hole formed on top end thereof, into which a nitrogen gas is injected; electrodes installed in one side of the nitrogen injection hole; and
   air injection holes formed on upper portion situated higher than the plasma generator connected to one side of outer periphery thereof, wherein the air injection holes of plurality are formed on the outer periphery of the burner with different heights in a clockwise or counter-clockwise direction.

4. The waste gas purification apparatus as set forth in claim 3, wherein each inlet passage of the air injection holes is inclined obliquely downward toward the center of the burner, such that the injected air may be aswirled inside the burner.

5. The waste gas purification apparatus as set forth in claim 2, wherein waste gas injection holes of plurality are formed on the outer periphery of the burner, situated lower than the portion connected with the plasma generator, wherein each inlet passage of the waste gas injection holes is inclined obliquely upward toward the center of the burner.

6. The waste gas purification apparatus as set forth in claim 2 or 5, wherein an fuel injection hole and an combustion gas injection hole are formed at the outer periphery of the burner, situated lower than the waste gas injection hole, and each inlet passage of the fuel injection hole and the combustion gas injection hole is inclined obliquely downward toward the center of the burner.

7. The waste gas purification apparatus as set forth in claim 2, wherein the combustion chamber includes a cooling water tank, in which cooling water is stored at outermost layer thereof, multiple layer of heat insulation material being formed toward the center thereof, a fuel supply tube being connected at the outer periphery to communicate with the cooling water tank, the fuel supply tube being connected with a guide tube embedded inside the cooling water tank, and the combustion chamber being connected to the fuel injection hole of the burner through the fuel supply tube connected to an outlet formed on top end of the cooling water tank.

8. The waste gas purification apparatus as set forth in claim 7, wherein the cooling water tank has 70-80% filled with cooling water.

9. The waste gas purification apparatus as set forth in claim 1, wherein the water reserve tank of the water reserve tank unit has a water supply pipe and a water drain pipe formed at lower portion thereof, and a conveying shoot, in which the purification gas is transported, formed at upper portion thereof.

10. The waste gas purification apparatus as set forth in claim 1, wherein the dust collector of the dust collector unit is a cyclone type dust collector.

11. The waste gas purification apparatus as set forth in claim 1, wherein the scrubber of the scrubber unit has a venturi tube.

12. The waste gas purification apparatus as set forth in claim 1, wherein the adsorber of the collector is a filter membrane coated with an adsorbing agent.

13. The waste gas purification apparatus as set forth in claim 1, wherein the remover of the collector is a honeycomb filter.

14. The waste gas purification apparatus as set forth in claim 1, wherein the water distributor of the collector is formed with a plurality of nozzles.

* * * * *